(12) United States Patent
Davidson et al.

(10) Patent No.: US 12,025,261 B2
(45) Date of Patent: Jul. 2, 2024

(54) ADJUSTABLE SUPPORT APPARATUSES

(71) Applicant: GUNWERKS, LLC, Cody, WY (US)

(72) Inventors: Aaron Davidson, Burlington, WY (US); Avery Smieja, Cody, WY (US)

(73) Assignee: GUNWERKS, LLC, Cody, WY (US)

( * ) Notice: Subject to any disclaimer, the term of this patent is extended or adjusted under 35 U.S.C. 154(b) by 0 days.

(21) Appl. No.: 17/827,158

(22) Filed: May 27, 2022

(65) Prior Publication Data
US 2023/0383896 A1 Nov. 30, 2023

(51) Int. Cl.
*F16M 11/16* (2006.01)
*F16M 11/26* (2006.01)

(52) U.S. Cl.
CPC ............ *F16M 11/16* (2013.01); *F16M 11/26* (2013.01)

(58) Field of Classification Search
CPC ...... F16M 11/16; F16M 11/26; F16M 11/041; F16M 11/242; F16M 11/245; F16M 11/24; F16M 2200/024; F41A 23/08; F41A 23/10; G03B 17/561; G03B 17/566
USPC ........................................................ 248/157
See application file for complete search history.

(56) References Cited

U.S. PATENT DOCUMENTS

| | | | | |
|---|---|---|---|---|
| 3,419,295 A * | 12/1968 | Small | ...................... | F16C 11/10 403/92 |
| 4,770,559 A * | 9/1988 | Yoo | ......................... | F16C 11/10 403/324 |
| 4,877,045 A * | 10/1989 | Lin | ......................... | A45B 17/00 135/74 |
| 5,265,969 A * | 11/1993 | Chuang | .................. | A45B 17/00 16/329 |
| 5,620,272 A * | 4/1997 | Sheng | ................. | E05D 11/1007 403/92 |
| 5,713,633 A * | 2/1998 | Lu | .......................... | B60N 2/847 403/93 |
| 5,984,245 A * | 11/1999 | Hsu | ........................ | F16M 11/38 248/164 |
| 6,364,562 B1 * | 4/2002 | Tung | ...................... | A45B 17/00 403/96 |
| 6,397,433 B1 * | 6/2002 | Chen | .................. | E05D 11/1007 403/324 |
| 6,773,172 B1 * | 8/2004 | Johnson | ................. | F16M 13/00 396/428 |
| 6,776,179 B1 * | 8/2004 | Chen | ...................... | E04H 15/48 135/147 |
| 6,923,416 B1 * | 8/2005 | Hsieh | ...................... | G10H 1/32 248/431 |
| 7,368,647 B2 * | 5/2008 | Hsieh | ...................... | G10G 5/00 248/431 |

(Continued)

*Primary Examiner* — Christopher Garft
(74) *Attorney, Agent, or Firm* — DORSEY & WHITNEY LLP

(57) ABSTRACT

An adjustable support apparatus can include a first bracket, a second bracket, and a base coupled to the first bracket. The first and second brackets can be rotatable relative to the base and the second bracket can translate relative to the first bracket. In a first configuration, the first and second brackets can be adjacent one another to retain a device (e.g., a mount, a camera, binoculars, a firearm, etc.) to the adjustable support apparatus. In a second configuration, the first and second brackets can be rotated relative to the base and the second bracket can translate away from the first bracket to release the device from the adjustable support apparatus.

20 Claims, 13 Drawing Sheets

(56) References Cited

U.S. PATENT DOCUMENTS

| | | | |
|---|---|---|---|
| 8,770,539 B1* | 7/2014 | Hsu | F16M 13/04 |
| | | | 248/688 |
| 8,869,658 B2* | 10/2014 | Chou | B25G 1/007 |
| | | | 81/177.8 |
| 10,012,465 B1* | 7/2018 | Liechty | F41A 23/10 |
| 2006/0185495 A1* | 8/2006 | Hsieh | F16M 11/38 |
| | | | 84/327 |
| 2009/0045304 A1* | 2/2009 | Faifer | F41A 23/08 |
| | | | 248/188.5 |
| 2014/0115940 A1* | 5/2014 | Bonelli | F16M 11/14 |
| | | | 42/94 |
| 2016/0209172 A1* | 7/2016 | Trotabas | F41G 1/44 |
| 2018/0202746 A1* | 7/2018 | Flood, Jr. | F41A 23/10 |
| 2019/0072355 A1* | 3/2019 | Pop | F41A 23/10 |
| 2020/0218139 A1* | 7/2020 | Tiefenbrunn | F16B 2/12 |

\* cited by examiner

ADJUSTABLE SUPPORT APPARATUSES

TECHNICAL FIELD

The present disclosure generally relates to adjustable support apparatuses and specifically relates to adjustment and retention mechanisms for tripods, bipods, window mounts and other support systems.

BACKGROUND

Tripods, bipods, monopods, and other types of support apparatuses are used to reliably retain devices, such as, cameras, rifles, scopes, binoculars, and photography equipment in a steadied and sturdy orientation near a user of the device. For example, monopods and bipods have been used by consumers in the firearms industries as a mobile shooting platform providing added accuracy in shot placement on a target. Monopods and bipods have likewise been used by consumers in the photography industry. These support apparatuses enable users to attain increased performance and utility of the devices coupled to the apparatuses. Accordingly, there is a constant need for improvements to various types of support apparatuses to further advance the performance and utility of the devices they support.

SUMMARY

One aspect of the present disclosure relates to an apparatus for supporting a device. The apparatus includes a support member and a retaining mechanism coupled to the support member and configured to releasably couple to the device. The retaining mechanism includes a first bracket, a second bracket, and a base coupled to the first bracket. The base is configured to enable rotation of the first bracket and the second bracket relative to an axis of rotation intersecting the base. The second bracket is configured to translate in a direction perpendicular to the axis of rotation during rotation of the first and second brackets about the axis of rotation.

In some embodiments, the axis of rotation can intersect the base and the first bracket. The base can form or define a nonlinear channel offset a distance from the axis of rotation. The channel can have a length correlating to a displacement of the second bracket relative to the base. The distance between the axis of rotation and the channel can vary along the length of the channel. The base can include a biasing member disposed within the channel. The biasing member can extend substantially the length of the channel. The second bracket can be biased to translate away from the first bracket. In some examples, the apparatus can include an actuator. In a first state, the actuator can prevent rotation of the first and second brackets about the axis of rotation. In a second state, the actuator can enable rotation of the first and second brackets about the axis of rotation. The support member can be a first support member and the apparatus can further include a second support member coupled to the retaining mechanism. The support member can be telescopic. In some examples, the first bracket can define a first slot and the second bracket can define a second slot. The retaining mechanism can be configured to removably couple to a rifle, a camera, or binoculars.

Another aspect of the disclosure relates to an apparatus for supporting a device. The apparatus includes a first support member, a second support member, and an adjustment mechanism coupled to the first and second support members. The adjustment mechanism can include a first coupler affixed to the first support member, a second coupler affixed to the second support member, a central member, an interlock, and an actuator. The second coupler can have a plurality of recesses defined about at least a portion of a periphery of the second coupler. The central member can be affixed to the first coupler and the second coupler. The central member can define an axis of rotation and at least one of the first coupler and the second coupler can be rotatable about the axis of rotation. The interlock can be disposed between the first coupler and the second coupler. The actuator can be coupled to the interlock and displace the interlock from a first recess of the plurality of recesses to a second recess of the plurality of recesses. The first recess can be radially offset relative to the second recess.

In some embodiments, the first and second couplers can define a first angle while the interlock is disposed in the first recess. The first and second couplers can define a second angle while the interlock is disposed in the second recess. The apparatus can include a spring biasing the interlock toward the plurality of recesses. The actuator can be at least partially disposed within the second coupler. The actuator can translate along an axis that is perpendicular to a longitudinal axis of the second coupler.

Yet another aspect of the disclosure relates to an apparatus for supporting a device. The apparatus includes a support member, a mounting bracket coupled to the support member, and an adjustment mechanism. The adjustment mechanism includes a coupler rotatably affixed to the mounting bracket. The coupler can form a curved surface. The adjustment mechanism can include a protrusion extending from the curved surface. The adjustment mechanism can include an interlock slideably coupled to the mounting bracket and positioned adjacent the curved surface of the coupler. The interlock can contact the protrusion to impede rotation of the mounting bracket relative to the coupler.

The above summary of the present invention is not intended to describe each embodiment or every implementation of the present invention. The Figures and the detailed description that follow more particularly exemplify one or more preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention can be realized by reference to the following drawings. In the appended figures, similar components or features can have the same reference label.

Figure 1:
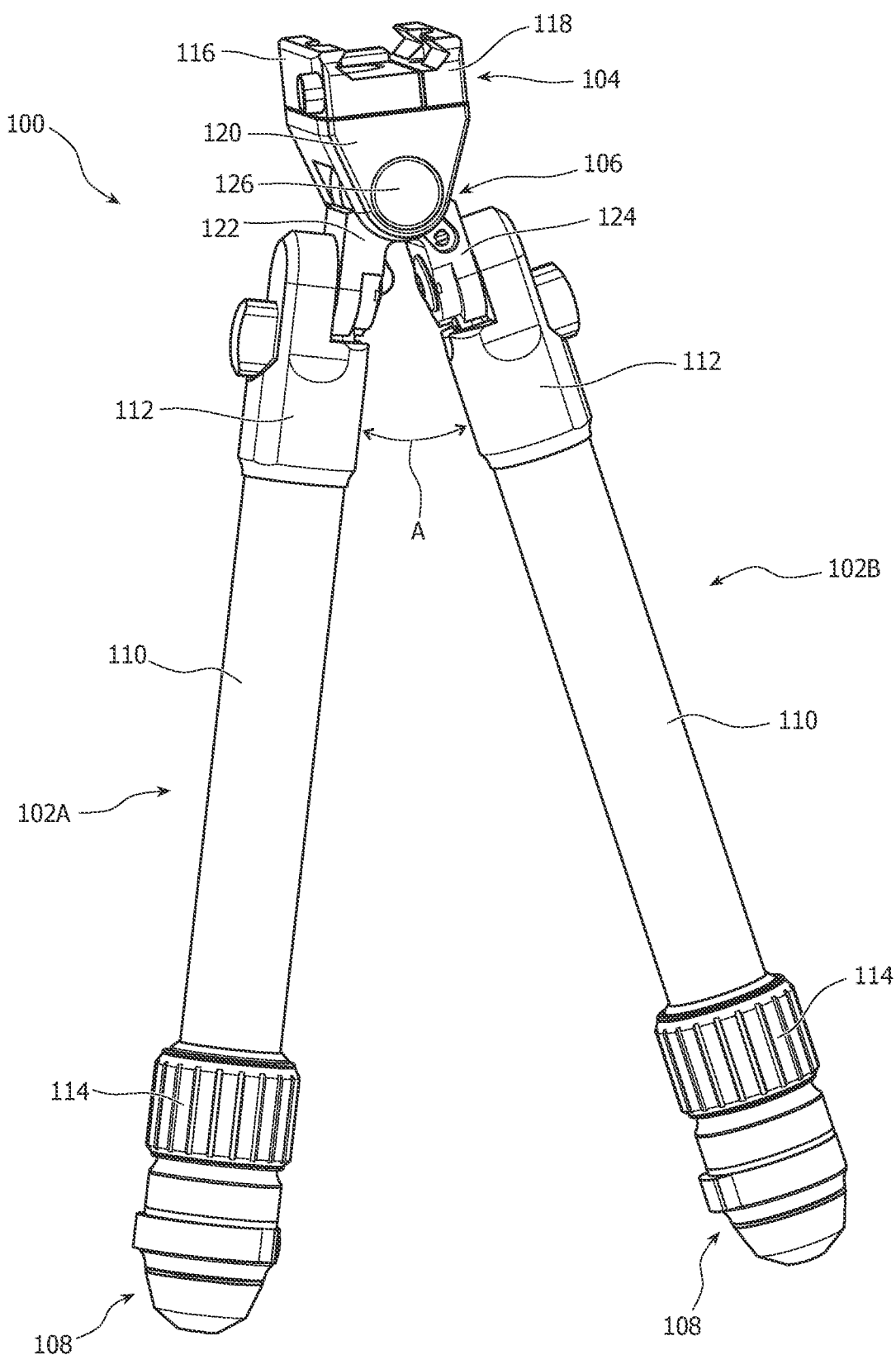
FIG. 1 is an isometric view of an adjustable support apparatus.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to support apparatuses including one or more adjustable components. In one aspect of the present disclosure, an adjustable support apparatus can include a first bracket, a second bracket, and a base coupled to the first bracket. In some examples, the first and second brackets can be rotatable relative to the base and the second bracket can translate relative to the first bracket. For example, in a first configuration, the first and second brackets can be adjacent one another to retain a device (e.g., a mount, a camera, binoculars, a firearm, etc.) to the adjustable support apparatus. In a second configuration, the first and second brackets can be rotated relative to the base and the second bracket can translate away from the first bracket to release the device from the adjustable support apparatus. In some examples, the second bracket can translate relative to the first bracket while the first and second brackets are being rotated relative to the base.

Another aspect of the disclosure relates to one or more adjustable support apparatuses including first support member that is radial adjustable, such that, an angle formed between the first support member and the second support member can be varied by a user of the adjustable support apparatus. For example, the first and second support members can be rotatable about an axis of rotation and the second support member can define one or more recesses that receive an interlock to adjustably retain the first and second support members at one or more angles.

Another aspect of the disclosure relates to one or more adjustable support apparatuses, each including one or more support members that are individually rotatable relative to an adjustment mechanism. In some examples, the adjustment mechanism can include a coupler forming a curved surface and a protrusion extending from the curved surface. An interlock coupled to a mounting bracket of the support member can contact the protrusion to inhibit rotation of the mounting bracket about the coupler and along the curved surface. In some examples, the protrusion is collapsible or inelastically deformable, such that, the interlock can rotate past the protrusion to allow the adjustment mechanism to rotate relative to the support member. Limiting or inhibiting rotation of the adjustment mechanism relative to the one or more support members can retain the adjustable support apparatus in a fixed state while the adjustable support apparatus is being stored or transported yet allow for the adjustable support apparatus to be modified to a an adjustable state when the adjustable support apparatus is being used.

The present description provides examples, and is not limiting of the scope, applicability, or configuration set forth in the claims. Thus, it will be understood that changes can be made in the function and arrangement of elements discussed without departing from the spirit and scope of the disclosure, and various embodiments can omit, substitute, or add other procedures or components as appropriate. For instance, features described with respect to certain embodiments can be combined in other embodiments.

Referring now to the figures in detail, FIG. 1 shows an apparatus 100 for supporting a device (e.g., a camera, binoculars, a scope, a firearm, an adapter, a smart phone, etc.). For example, the apparatus 100 can be a bipod for supporting a firearm (e.g., a rifle) to assist the user in accurately and comfortably discharging the rifle at a target while the user is in s a standing, sitting, or prone position. In some examples, the apparatus 100 can be a monopod, a bipod, a tripod, or other adjustable support for retaining a device in a fixed position. The apparatus 100 can include one or more support members 102A, 102B, a retaining mechanism 104, and an adjustment mechanism 106. Each of the support members 102A, 102B can include a foot 108, a tube 110, and a mounting bracket 112. In some examples, the feet 108 can be displaced from the mounting bracket 112 such that, the support members 102A, 102B vary in length to set a height at which the retaining mechanism 104 couples to a device (not shown). For example, each of the one or more support members 102A, 102B can be configured to telescope or otherwise lengthen by housing one or more additional tubes (not shown) within or partially within the tube 110. In some examples, each of the support members 102A, 102B can include a handle portion 114 that is rotatable to release and lock the additional tubes (not shown) relative to the tube 110 to vary the length of the support members 102A, 102B.

The tubes 110 and mounting brackets 112 of each support member 102A, 102B can be formed from a carbon fiber, a carbon-fiber reinforced epoxy, an aluminum alloy, steel, a natural or synthetic polymer, a combination thereof, or any other material. The mounting brackets 112 can be adhered, fastened, welded, or otherwise affixed to the respective tubes 110. In some examples, the mounting brackets 112 and the tubes 110 can be integrally formed as a singular unitary structure. While the apparatus 100 illustrated in FIG. 1 shows two support members 102A, 102B, other embodiments of the apparatus 100 can have additional or fewer support members (e.g., monopod, bipod, tripod, etc.).

The retaining mechanism 104 can include a first bracket 116, a second bracket 118, and a base 120. The first and second brackets 116, 118 can rotate relative to the base 120 while the second bracket 118 translates relative to the first bracket 116 (see FIGS. 2C and 2E) to enable the retaining mechanism 104 to be removably coupled to a rifle, a camera, a spotting scope, or another device. The retaining mechanism 104 will be described in greater detail below with reference to FIGS. 2A-2I.

The adjustment mechanism 106 can include a first coupler 122, a second coupler 124, and a central member 126. One or more of the first and second couplers 122, 124 can be rotatable about an axis of rotation (see FIG. 3C) defined by the central member 126. For example, one or more of the first and second couplers 122, 124 can rotate about the central member 126 to vary an angle A formed between the first and second support members 102A, 102B. The adjustment mechanism 106 will be described in greater detail below with reference to FIGS. 3A-3E. The rotational attributes of the first and second couplers 122, 124 and the respective support members 102A, 102B will be described in greater detail below with reference to FIGS. 4A-4C.

Figure 2A:
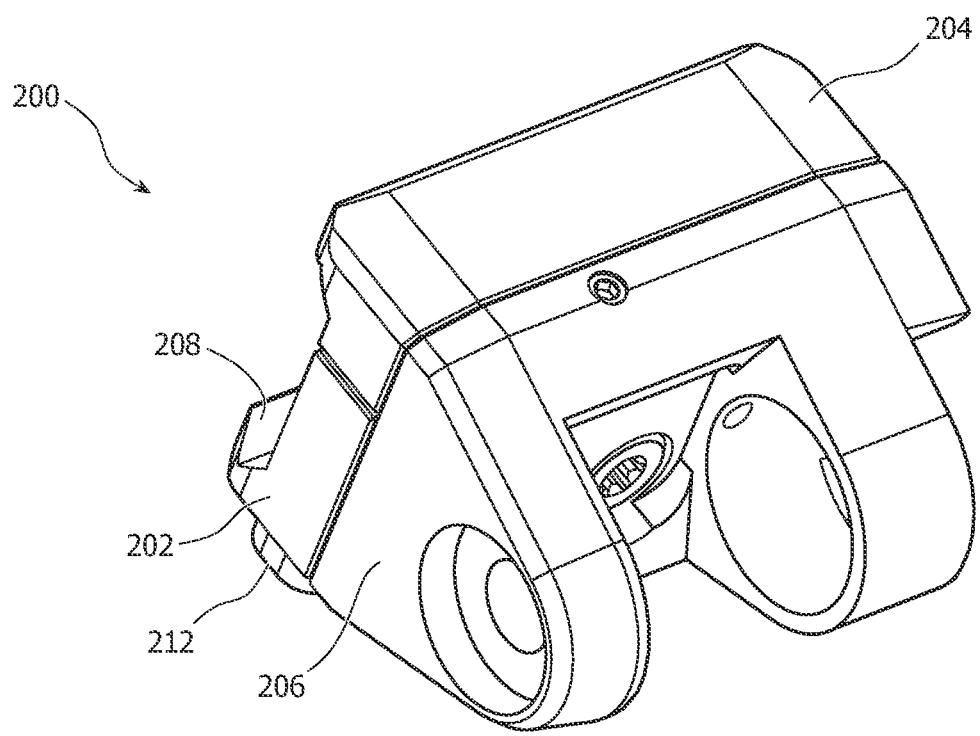
FIG. 2A is an isometric bottom view of a retaining mechanism in a first configuration, according to some embodiments.
Figure 2B:
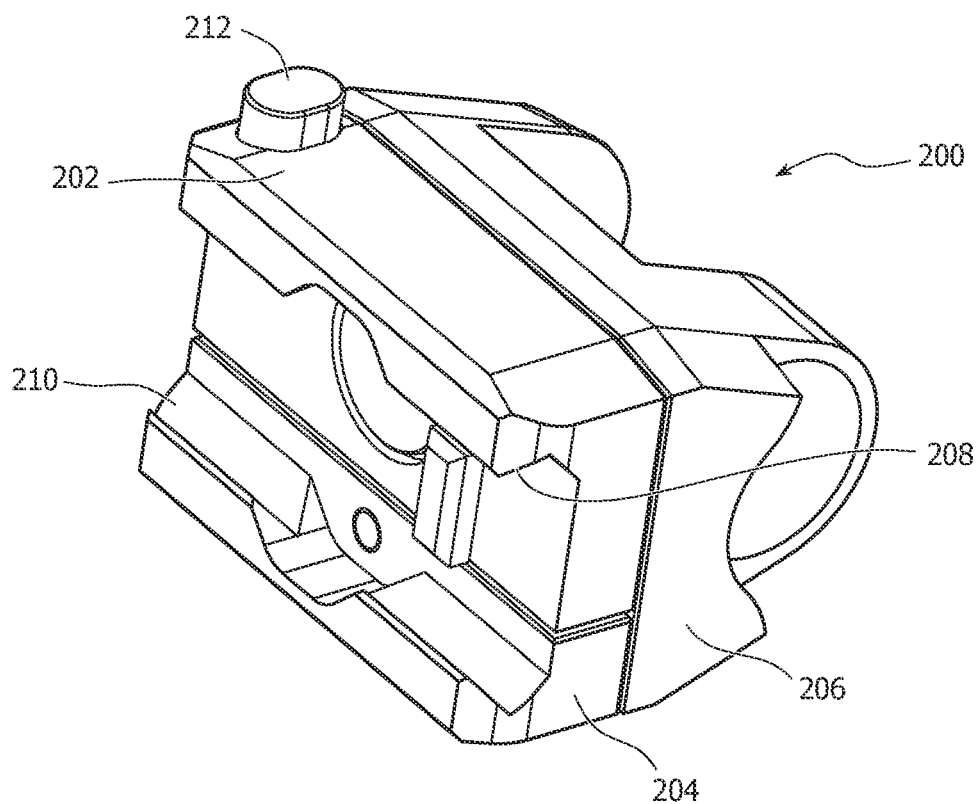
FIG. 2B is an isometric top view of the retaining mechanism in the first configuration.

FIGS. 2A and 2B show respective bottom and top isometric views of a retaining mechanism 200. The retaining mechanism 200 can include a first bracket 202, a second bracket 204, and a base 206. The first bracket 202 can include a cutout or slot 208 and the second bracket can include a correlating cutout or slot 210 that at least partially mirrors the slot 208. These slots 208, 210 can releasably retain a device or mount to the retaining mechanism 200. For example, the second bracket 204 can translate relative to the first bracket 202 to vary a distance between the slots 208, 210. In some examples, the first bracket 202 and the second bracket 204 can be rotatable relative to the base 206. For example, the first bracket 202 can be rotatably coupled to the base 206. In some examples, rotation of the first and second brackets 202, 204 can cause the second bracket 204 to simultaneously translate relative to the first bracket 202.

Figure 2C:
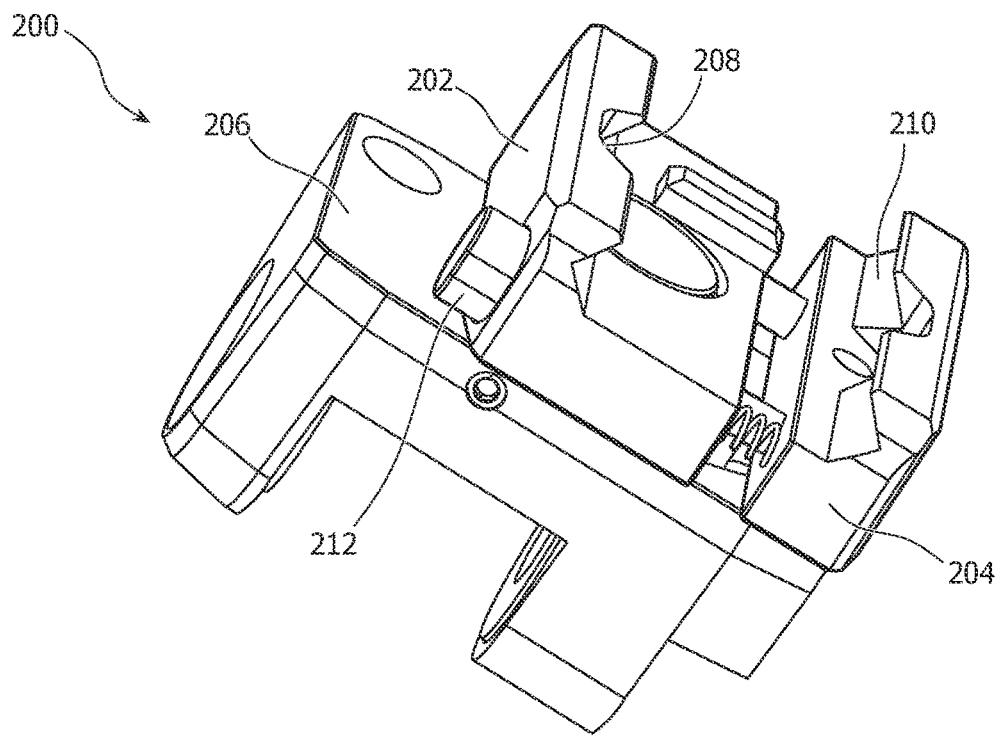
FIG. 2C is an isometric top view of the retaining mechanism in a second configuration.
Figure 2D:
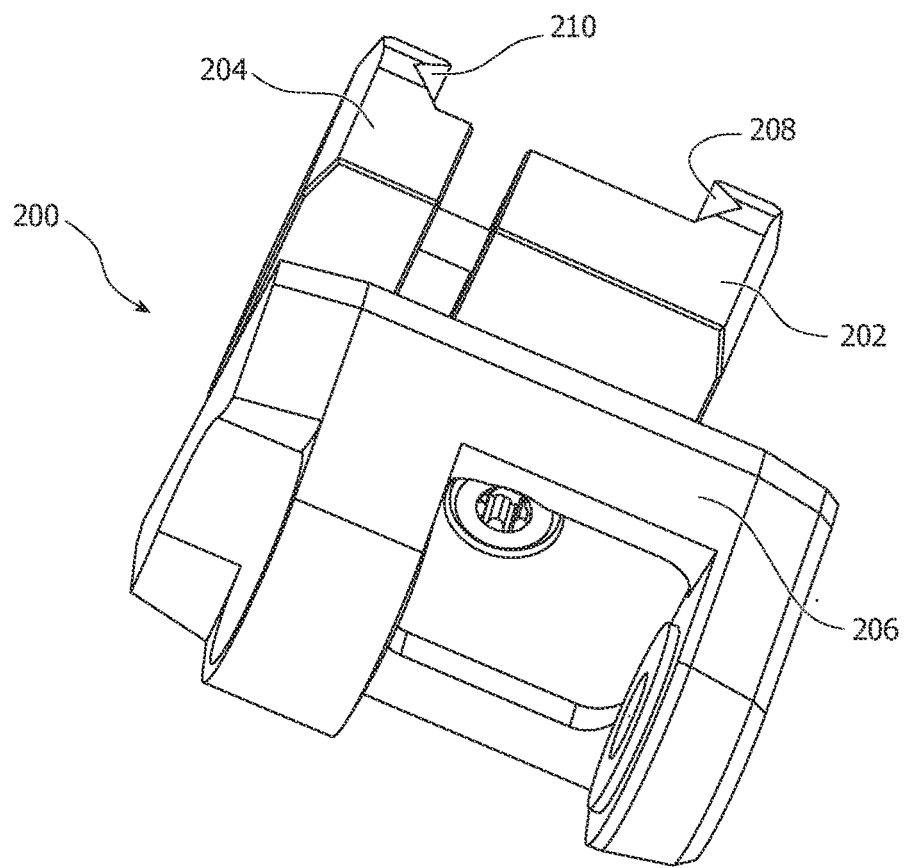
FIG. 2D is an isometric bottom view of the retaining mechanism in the second configuration.

FIGS. 2A and 2B show respective bottom and top isometric views of the retaining mechanism 200 in a first configuration. FIGS. 2C and 2D show respective top and bottom isometric views of the retaining mechanism 200 in a second configuration. In the second configuration, the distance between the respective slots 208, 210 of the first and second brackets 202, 204 is greater than the distance between the respective slots 208, 210 while the retaining mechanism 200 is in the first configuration. In the second configuration, a device, such as, a mount, a rifle, a spotting scope, a camera, or other device can be at least partially disposed between the slots 208, 210 and then the first and second brackets 202, 204 (or the base 206) can be rotated to the first configuration to collapse or draw the first and second brackets 202, 204 together to lock or couple the device to the retaining mechanism 200. To remove the device, the first and second brackets 202, 204 (or the base 206) can be rotated back to the second configuration to expand or distance the second bracket 204 from the first bracket 202. In some examples, the retaining mechanism 200 can be held in the first configuration until an actuator (e.g., a button 212) is actuated by a user. Thereafter, the first and second brackets 202, 204 can be freely rotated relative to the base 206. While the first and second brackets 202, 204 are described as being rotatable relative to the base 206, the base 206 can be considered rotatable relative to the first and second brackets 202, 204. For example, a user of the retaining mechanism 200 can rotate the base 206 while the first and second brackets 202, 204 remain stationary relative to the device (e.g., a rifle) being coupled to or removed from the retaining mechanism 200.

Figure 2E:
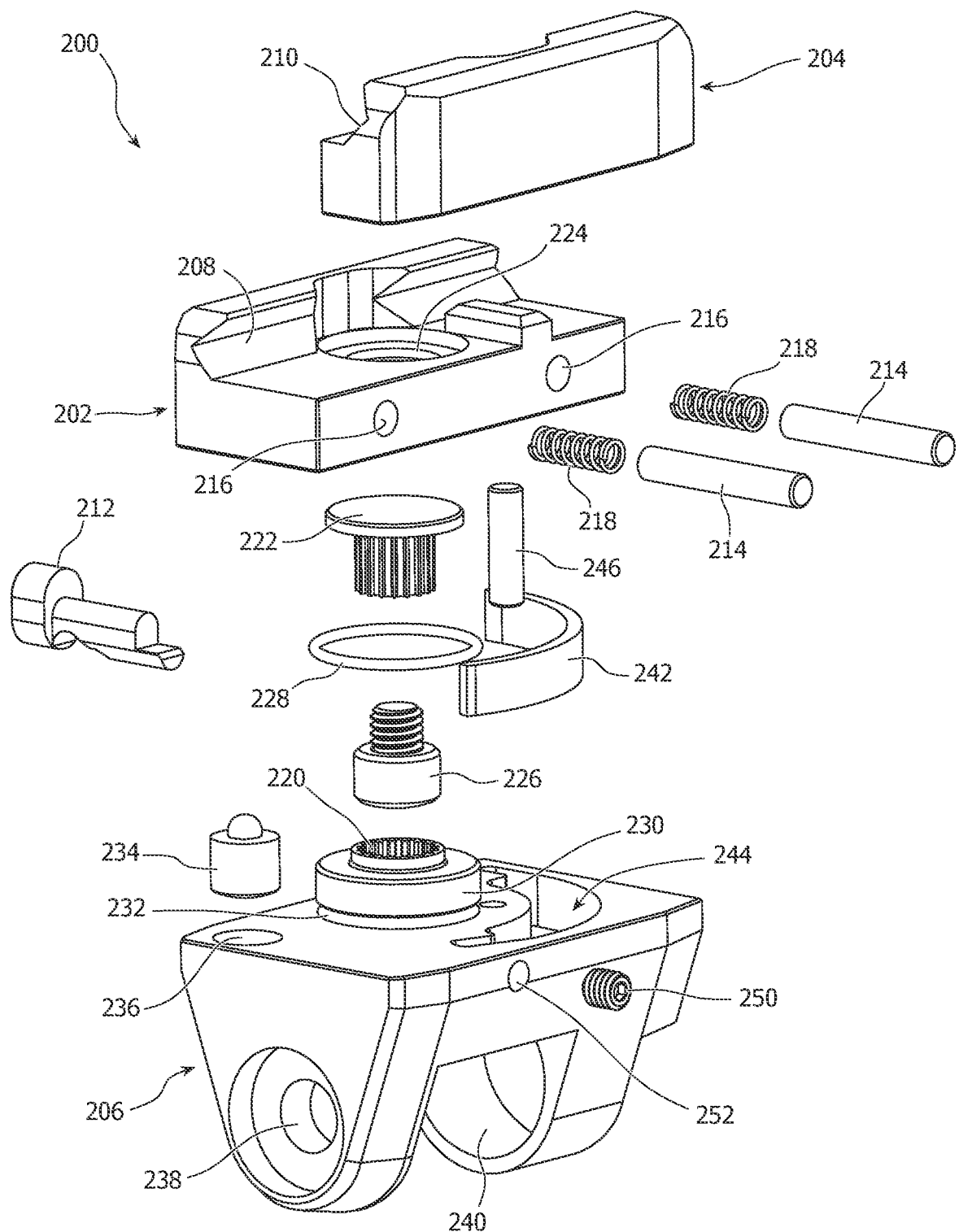
FIG. 2E is an exploded isometric side view of the retaining mechanism.
Figure 2F:
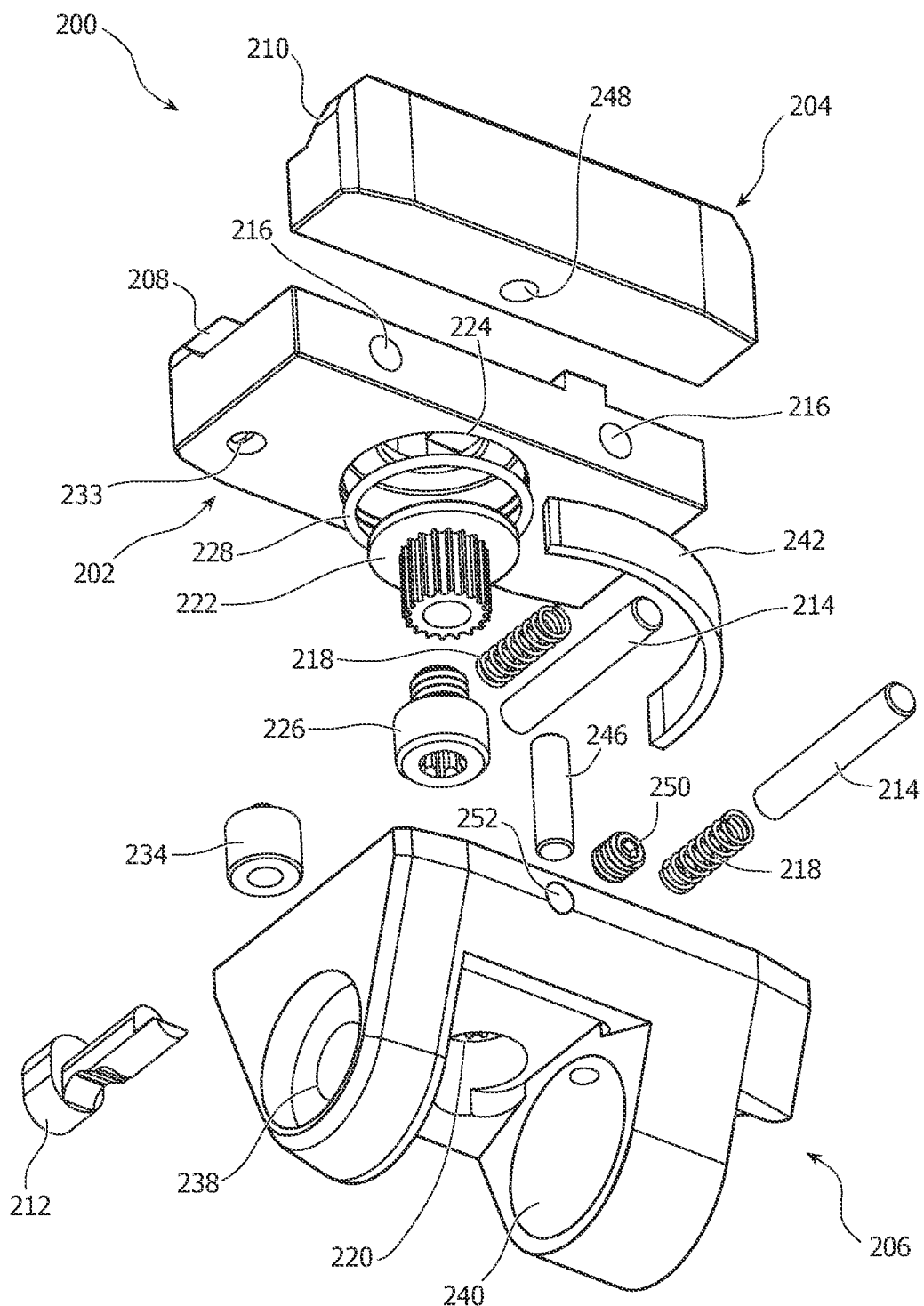
FIG. 2F is an exploded isometric bottom view of the retaining mechanism.

FIGS. 2E and 2F show respective side and bottom isometric exploded views of the retaining mechanism 200. In some examples, the second bracket 204 can be movably or translatably coupled to the first bracket 202 by one or more pins 214 disposed within respective blind-holes 216 of the first bracket 202 and blind-holes (not shown) of the second bracket 204. The first bracket 202 and/or the second bracket 204 can slide or translate along the one or more pins 214 while the retaining mechanism 200 transitions between the first and second configurations. In some examples, one or more biasing elements (e.g., springs 218) can be disposed about the pins 214 and between the first and second brackets 202, 204 to bias the second bracket 204 away from the first bracket 202.

In some examples, the base 206 can form an aperture (e.g., a splined aperture 220) configured to receive an intermediate element (e.g., a splined coupler 222). The splined coupler 222 can be extended through an aperture 224 formed within the first bracket 202 and at least partially received within the splined aperture 220 of the base 206. A fastener 226 can be threadably received within the splined coupler 222 to rotatably couple or fasten the first bracket 202 to the base 206. The splined coupler 222 can form or define an axis of rotation (see FIGS. 2H and 2I) that intersects the base 206 and the first bracket 202. In some examples, one or more O-rings 228 can be disposed between the splined coupler 222, the first bracket 202, the base 206, or a combination thereof. For example, an O-ring 228 can be disposed within the aperture 224 and between the first bracket 202 and the base 206. The one or more O-rings 228 can limit or prevent ingress of dust, debris, liquids, or other contaminants between the splined coupler 222, the first bracket 202, the base 206, or a combination thereof. Additionally, or alternatively, the one or more O-rings 228 can mitigate frictional forces between one or more components of the retaining mechanism 200 while the first and second brackets 202, 204 are rotated relative to the base 206. For example, the splined aperture 220 of the base 206 can be formed on a raised portion 230 of the base 206 and an O-ring 228 can be disposed in a groove 232 formed between the raised portion 230 and the base 206 to mitigate friction while the first and second brackets 202, 204 are rotated relative to the base 206.

In some examples, the button 212 can be at least partially disposed within the first bracket 202 and translatable along an axis that intersects the first bracket 202 to decouple release the first bracket 202 from the base 206 to enable rotation. For example, translation of the button 212 can drive a detent 234 (a ball-bearing biased from an enclosure) out of contact with the first bracket 202 and enable rotation of the first bracket 202 relative to the base 206 about the axis of rotation defined by the splined coupler 222. The detent 234 can be disposed within a blind-hole 236 formed within the base 206 and retractably extend into a recess or aperture 233 formed on the first bracket 202. It will be appreciated that the button 212 can alternatively be disposed within the base 206 and the detent 234 can be disposed within the first bracket 202. In some examples, the base 206 can define one or more through-holes 238, 240 which can receive one or more components of an adjustment mechanism (e.g., adjustment mechanism 106) and enable rotation of the adjustment mechanism relative to the retaining mechanism 200. The adjustment mechanism will be described in greater detail herein with reference to FIGS. 3A-3E.

The retaining mechanism 200 can include a biasing member (e.g., a spring 242) disposed within a channel 244 formed by the base 206. The channel 244 can be radial and extend about the axis of rotation formed by the splined coupler 222. The channel 244 can be displaced a non-uniform distance from the axis of rotation along the length of the channel 244. In other words, a distance between the channel 244 and the splined coupler 222 can vary along the length of the channel 244. A pin 246 or other protrusion can extend from the second bracket 204 and into the channel 244. For example, the pin 246 can be partially disposed within a blind-hole 248 formed by the second bracket 204. The pin 246 can extend into the channel 244 and radially translate through the channel 244 as the first and second brackets 202, 204 rotate relative to the base 206. As the pin 246 radially translates along the channel 244, the pin 246 and the second bracket 204 are forced to translate away/ toward the axis of rotation and the first bracket 202. The second bracket 204 can translate along an axis that is perpendicular to the axis of rotation. The spring 242 can apply a biasing force to the pin 246. In some examples, the spring 242 can be retained within the channel 244, for example, by a fastener 250 extending through a hole 252 formed by the base 206. Rotation of the first and second brackets 202, 204 relative to the base 206 will be discussed in further detail below with reference to FIGS. 2G-2I.

Figure 2G:
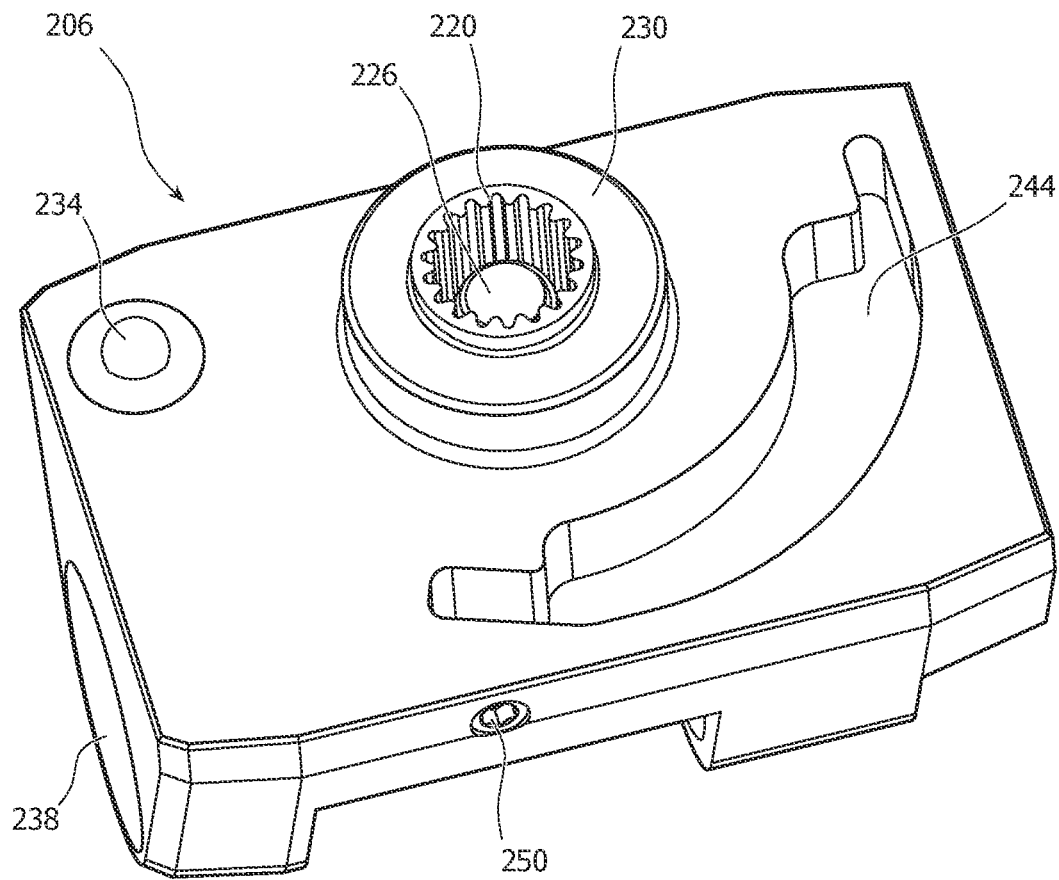
FIG. 2G is an isometric top view of a base of the retaining mechanism.
Figure 2H:
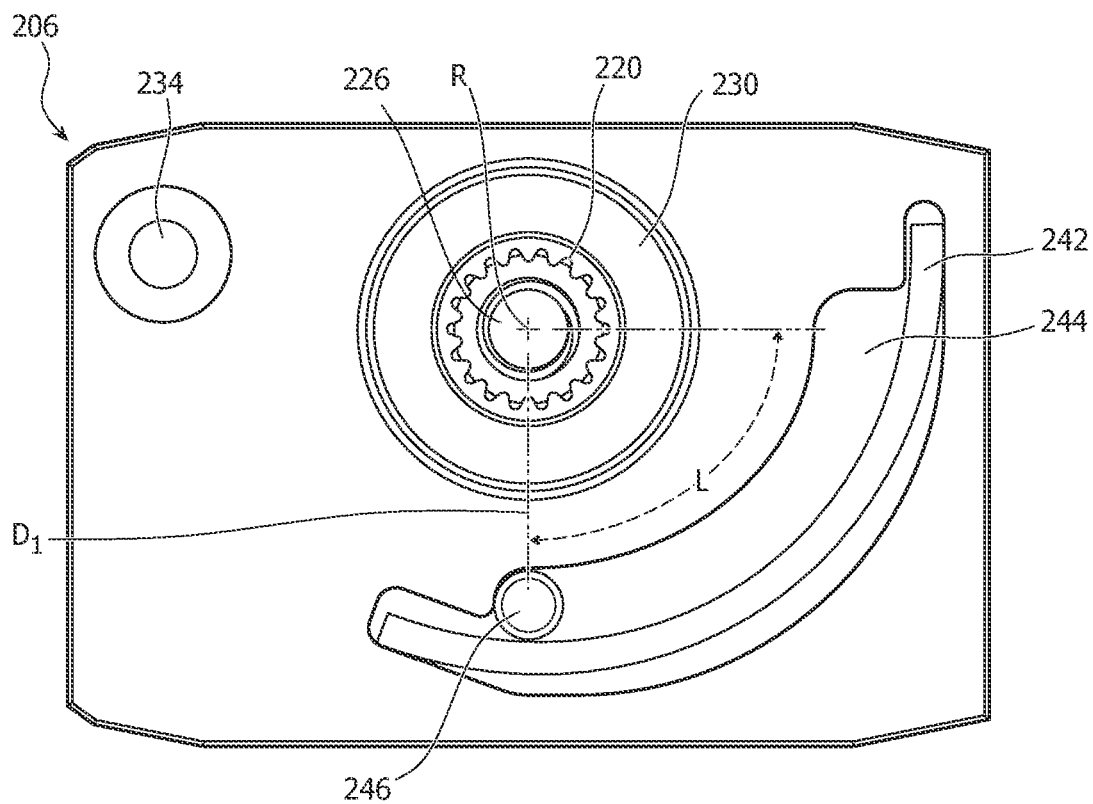
FIG. 2H is a top view of the base having a pin in a first configuration.
Figure 2I:
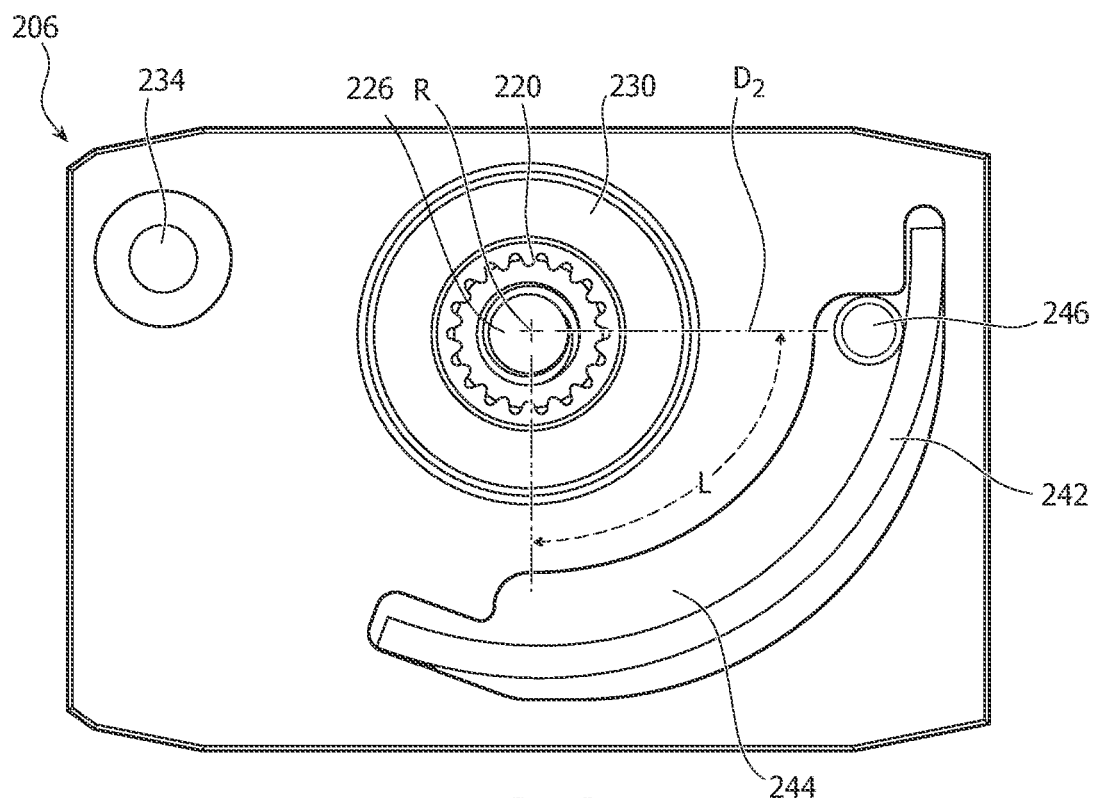
FIG. 2I is a top view of the base having the pin in a second configuration.

FIG. 2G shows a top view of the base 206 including the channel 244 formed within a surface 254 facing the first and second mounting brackets 202, 204. FIGS. 2H and 2I show top views of the base 206 and the pin 246 while the retaining mechanism is in the first configuration and the second configuration, respectively. The channel 244 can be radial and extend at least a length L about the axis of rotation defined by the splined coupler 222. The channel 244 can be displaced a non-uniform distance from the axis of rotation along the length L of the channel 244. In other words, a distance between the channel 244 and the splined coupler 222 can vary along the length L of the channel 244. While the channel 244 is depicted as extending about 90 degrees about axis of rotation R in FIGS. 2H and 2I, in other examples, the channel 244 can extend more or less than 90 degrees about the axis of rotation R.

In the first configuration (shown in FIGS. 2B and 2H), the pin 246 can be disposed within the channel 244 and displaced from the axis of rotation R by a distance of D1. In the second configuration (shown in FIGS. 2C and 2I), the pin 246 can be disposed within the channel 244 and displaced from the axis of rotation R by a distance of D2. The distance D1 can be different than the distance D2, such that, the second mounting bracket 204 coupled to the pin 246 is translated away from the axis of rotation R when the first and second mounting brackets 202, 204 are rotated relative to the base 206 from the first configuration to the second configuration. Likewise, the second mounting bracket 204 coupled to the pin 246 can be translated toward the axis of rotation R when the first and second mounting brackets 202, 204 are rotated relative to the base 206 from the second configuration to the first configuration. Thus, the difference between the distances D1 and D2 can correlate to a displacement of the second bracket 204 between the first and second configurations. This translation or displacement of the second mounting bracket 204 relative to the first mounting bracket 202 can enable a mount or other portion of a device to be releasably retained between the first and second mounting brackets 202, 204.

Figure 3A:
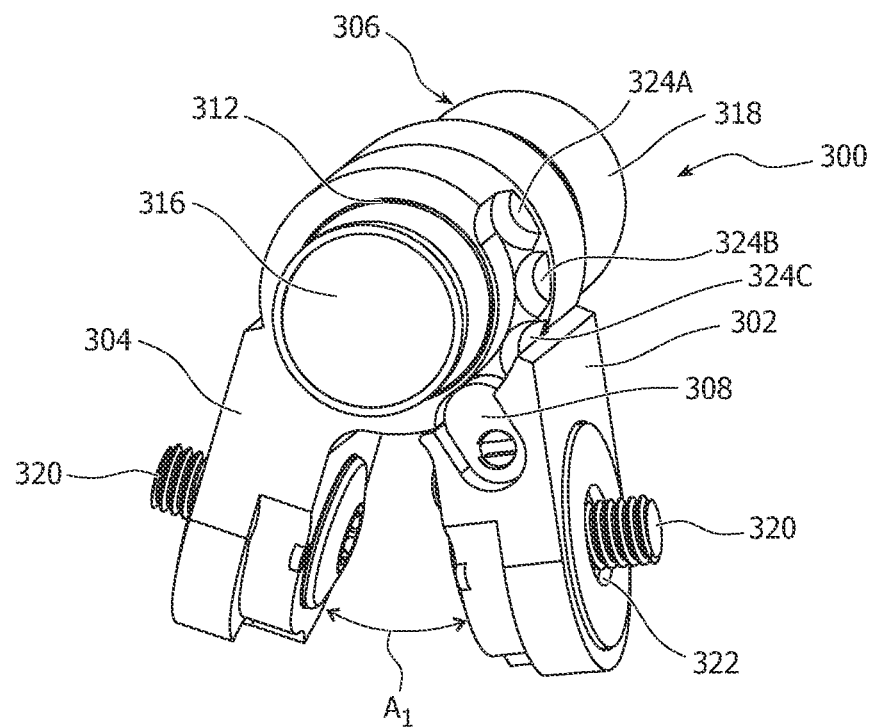
FIG. 3A is an isometric front view of an adjustment mechanism, according to some embodiments.
Figure 3B:
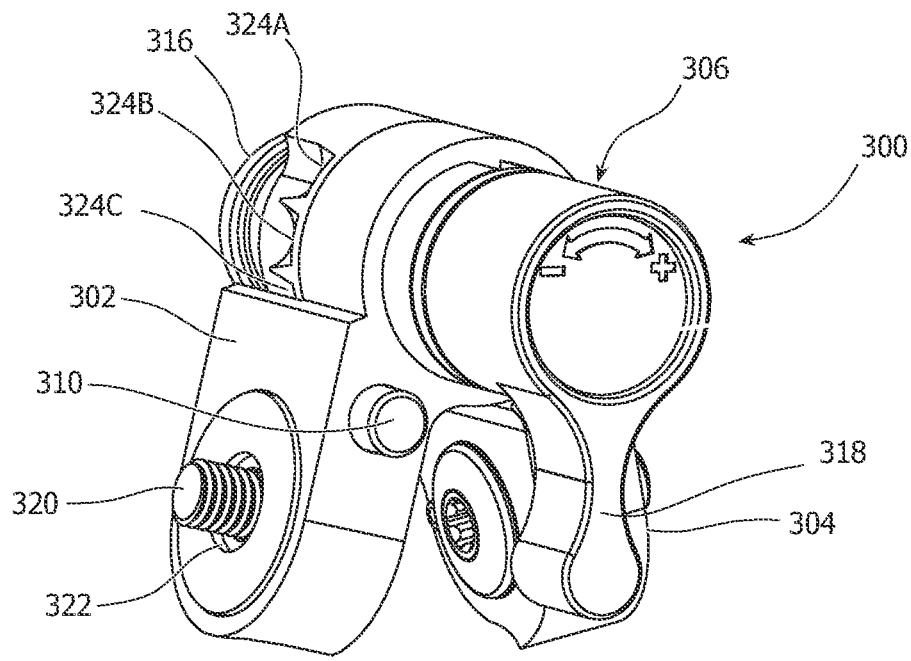
FIG. 3B is an isometric rear view of the adjustment mechanism in a first configuration.
Figure 3C:
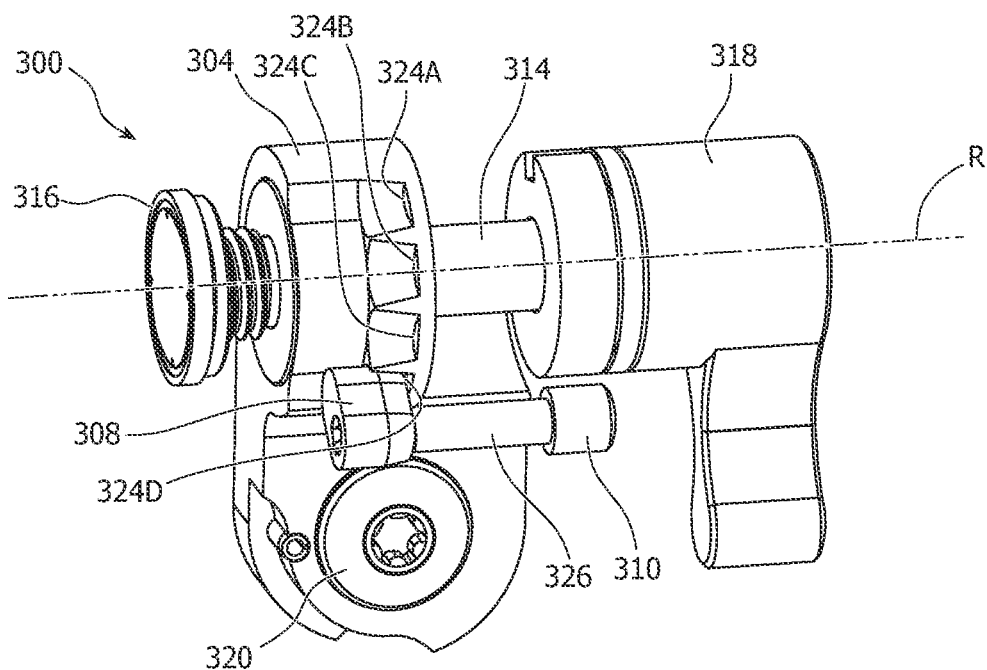
FIG. 3C is a side view of the adjustment mechanism in the first configuration.
Figure 3D:
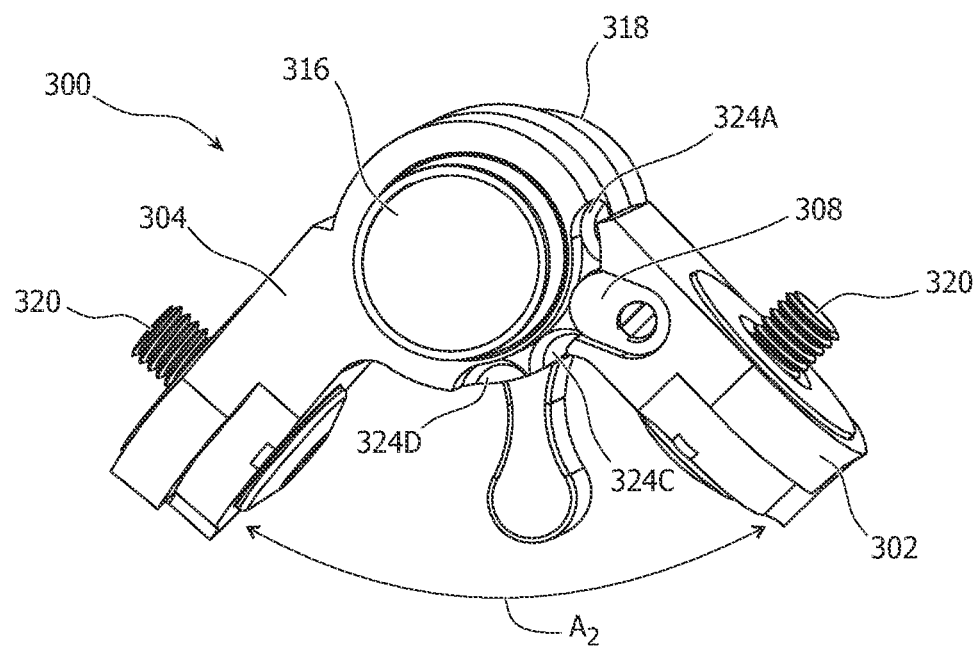
FIG. 3D is an isometric front view of the adjustment mechanism in a second configuration.

FIGS. 3A-3C show various isometric views of an adjustment mechanism 300 including a first coupler 302, a second coupler 304, a central member 306, an interlock 308, and an actuator 310 at least partially disposed within the second coupler 304. The central member 306 can define an axis of rotation R and one or more of the first and second couplers 302, 304 can rotate about the axis of rotation R. Thus, one or more of the first and second couplers 302, 304 can be rotatably coupled to the central member 306. For example, the first coupler 302 can form a through-hole or aperture 312 and at least a portion of the central member 306 can be disposed within the aperture 312 to rotatably couple the central member 306 and the first coupler 302.

In some examples, the central member 306 can be formed from multiple discrete components that are fastened or otherwise affixed together. The central member 306 can include one or more threadably coupled components that can be rotated relative to one another to generate compressive forces within the central member 306. For example, the central member 306 can include a cylinder 314 coupled to a threaded cap 316 on a first side of the cylinder 314 and coupled to a lever 318 on a second side of the cylinder 314. When the lever 318 is rotated about the axis of rotation R, the threaded cap 316 can be translated relative to the lever 318 to vary a compressive force exerted on the first and second couplers 302, 304. For example, a clockwise rotation of the lever 318 (shown in FIG. 3B) can increase the compressive force exerted on the first and second couplers 302, 304 to limit or prevent radial movement of the first and second couplers 302, 304 about the central member 306. Conversely, a counter-clockwise rotation of the lever 318 (shown in FIG. 3B) can decrease the compressive force exerted on the first and second couplers 302, 304 to enable or allow radial movement of the first and second couplers 302, 304 about the central member 306. In other examples, a counter-clockwise rotation of the lever 318 can increase the compressive forces while a clockwise turn decreases the compressive forces.

In some examples, each of first and second couplers 302, 304 can be affixed to respective support members (e.g., support members 102A, 102B). For example, a fastener 320 can be disposed within a through-hole 322 formed within first coupler 302 and threadably engage the support member (not shown) to affix the first coupler 302 to the support member. Similarly, a fastener 320 can be disposed within a through-hole formed within second coupler 304 and threadably engage the support member to affix the second coupler 304 to the support member. In some examples, the first and second couplers 302, 304 can be repositionable to vary an angle (e.g., angle A shown in FIG. 1) formed between the respective support members. For example, the second coupler 304 can define or form multiple recesses 324A, 324B, 324C, 324D about at least a portion of a periphery of the second coupler 304. The angle between the support members shown in FIG. 1 can be determined or set based on which particular recess of the plurality of recesses 324A, 324B, 324C, 324D the interlock 308 is disposed. For example, the adjustment mechanism 300 shown in FIGS. 3A-C can be in a first configuration having an angle $A_1$ between the first and second couplers 302, 304 due to the interlock 308 being positioned in the recess 324D while the adjustment mechanism 300 shown in FIGS. 3D and 3E can be in a second configuration having an angle $A_2$ between the first and second couplers 302, 304 due to the interlock 308 being positioned in the recess 324B. The angle $A_1$ between the first and second couplers 302, 304 shown in FIG. 3B can be narrower or smaller than the angle $A_2$ between the first and second couplers 302, 304 shown in FIG. 3D. The interlock 308 can be alternatively disposed within one of the recesses 324A or 324C to position the first and second couplers 302, 304 at angles different from angles $A_1$, $A_2$.

Figure 3E:
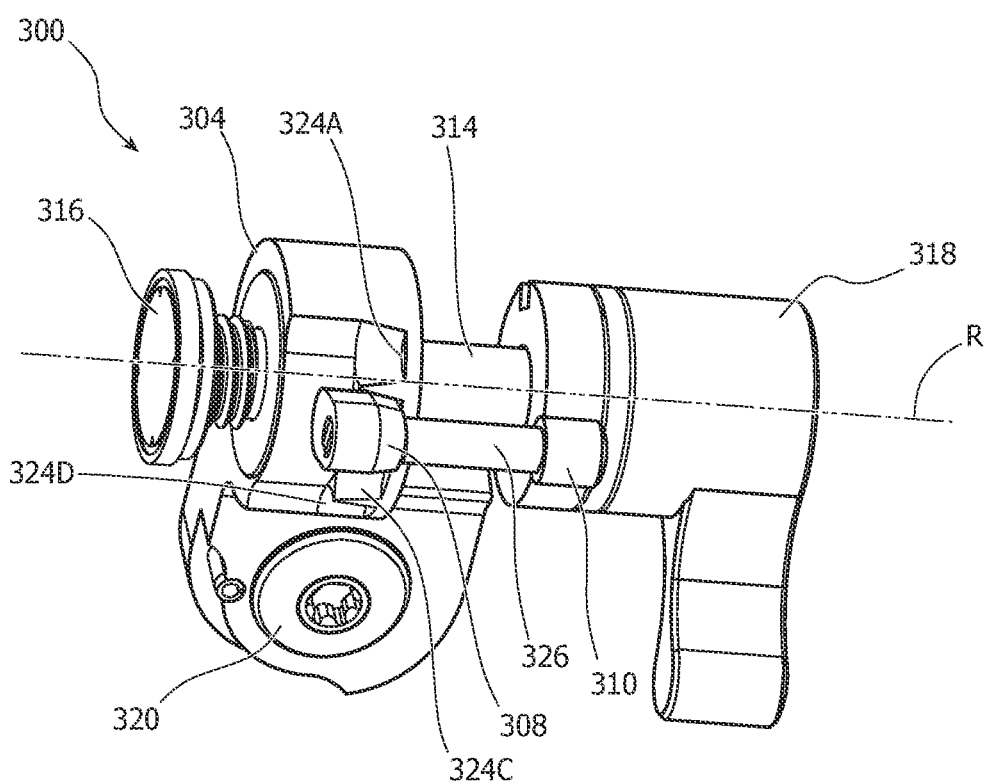
FIG. 3E is a side view of the adjustment mechanism in the second configuration.

The plurality of recesses 324A, 324B, 324C, 324D can enable the first and second couplers 302, 304 to be set at one of multiple angles from one another. For example, the plurality of recesses 324A, 324B, 324C, 324D can enable the first and second couplers 302, 304 to be set within a range of angles from about 5 degrees to about 135 degrees. While FIGS. 3A-3E show a total of four recesses (i.e., recesses 324A, 324B, 324C, 324D) formed about the periphery of the second coupler 304, the second coupler 304 can have more or fewer recesses formed about the periphery, such as, more than four recesses or less than four recesses. As shown in FIGS. 3C and 3E, the interlock 308 can be coupled to the actuator 310 by an elongate member 326 extending through the first coupler 302. Thus, the first coupler 302 is retained at a particular position relative to the second coupler 304 based on the interlock 308 being at least partially captured or retained within one of the recesses 324A, 324B, 324C, 324D. In some examples, the actuator 310 can be pressed or translated by a user along an axis that is substantially perpendicular to a longitudinal axis formed by the second coupler 304 to displace the interlock 308 from a particular recess of the multiple recesses 324A, 324B, 324C, 324D. While the interlock 308 is displaced or temporarily removed from the recess, the first coupler 302, the second coupler 304, or a combination thereof can be rotated about the central member 306. The user can align the interlock 308 with a recess correlating to a desired angle between the first and second couplers 302, 304 before translating or moving the interlock 308 into the desired recess (e.g., one of the plurality of recesses 324A, 324B, 324C, 324D). In some examples, the interlock 308 can be biased (e.g., by a spring) to translate toward the actuator 310 such that the interlock 308 is biased to be seated within one of the plurality of recesses 324A, 324B, 324C, 324D when the user stops pressing the actuator 310.

Figure 4A:
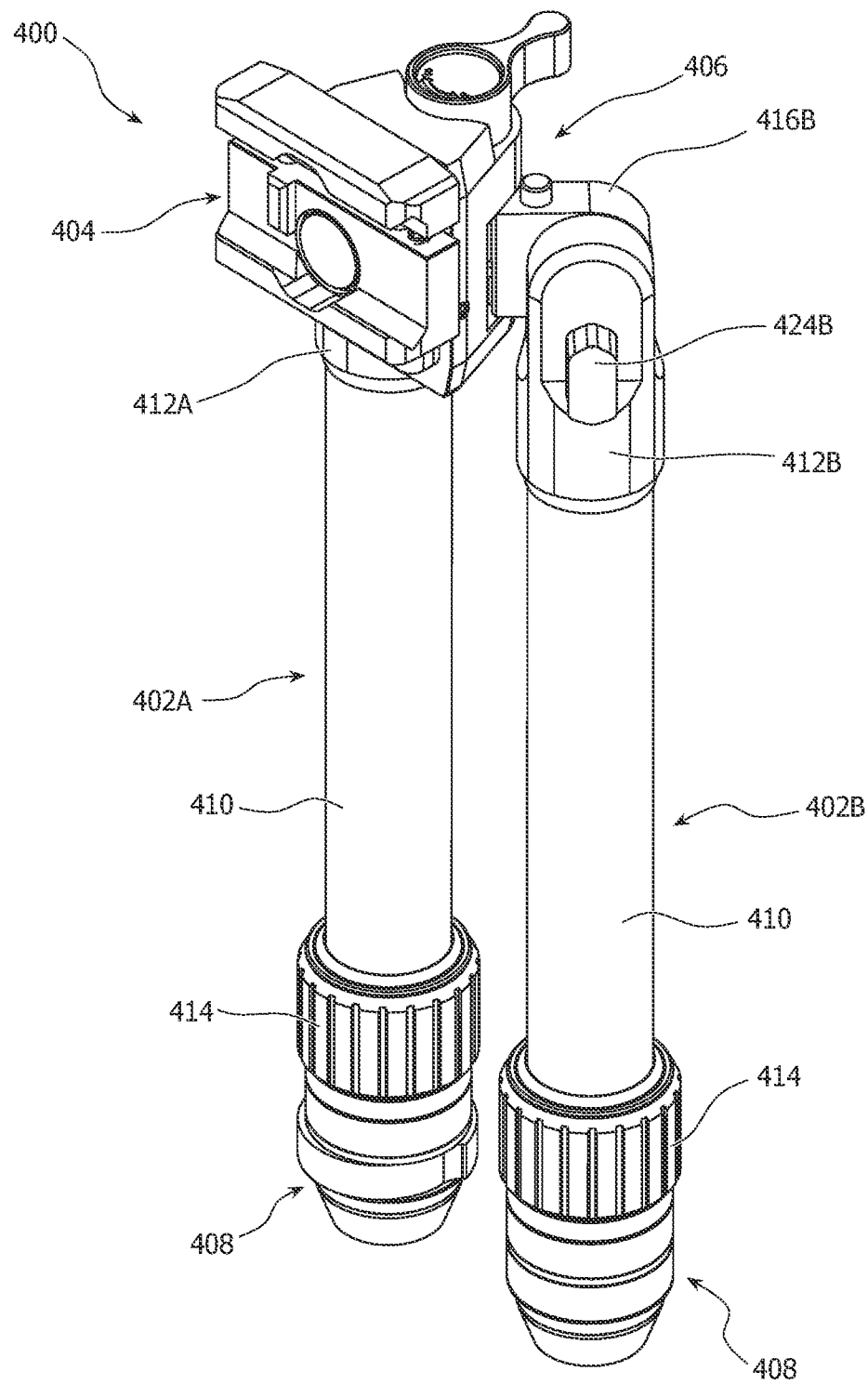
FIG. 4A is an isometric front view of an adjustable support apparatus, according to some embodiments.

FIG. 4A shows an apparatus 400 for supporting a device (e.g., a camera, binoculars, a scope, a firearm, an adapter, a smart phone, etc.). For example, the apparatus 400 can be a bipod for supporting a firearm (e.g., a rifle) to assist the user in accurately and comfortably discharging the rifle at a target. In some examples, the apparatus 400 can be a monopod, a bipod, a tripod, or other adjustable support for retaining a device in a fixed position. The apparatus 400 can be substantially similar to, and can include some or all of, the features of the apparatus 100. For example, the apparatus 400 can include one or more support members 402A, 402B, a retaining mechanism 404, and an adjustment mechanism 406. Each of the support members 402A, 402B can include a foot 408, a tube 410, and a mounting bracket 412A, 412B. In some examples, the feet 408 can be displaced from the mounting bracket 412 such that, the support members 402A, 402B vary in length to regulate a height at which the retaining mechanism 404 couples to a device (not shown). For example, each of the one or more support members 402A, 402B can be configured to telescope or otherwise lengthen by housing one or more additional tubes (not shown) within or partially within the tube 410. In some examples, each of the support members 402A, 402B can include a handle portion 414 that is rotatable to release and lock the additional tubes (not shown) relative to the tube 410 to vary the length of the support members 402A, 402B.

The retaining mechanism 404 can be substantially similar to, and can include some or all of, the features of the retaining mechanisms 104, 200. For example, the retaining mechanism 404 can have one or more components that are repositionable (e.g., first and second mounting brackets) from the first configuration and the second configuration as described above with reference to FIGS. 2A-2I. The adjustment mechanism 406 can be substantially similar to, and can include some or all of, the features of the adjustment mechanisms 106, 300. For example, the adjustment mechanism 406 can have one or more components that are repositionable (e.g., first and second couplers) from the first configuration and the second configuration as described above with reference to FIGS. 3A-3E. Any of the features described with respect to certain embodiments shown in FIGS. 1-3E can be combined or directly apply to the embodiments of the apparatus 400 shown in FIGS. 4A-4C.

Figure 4B:
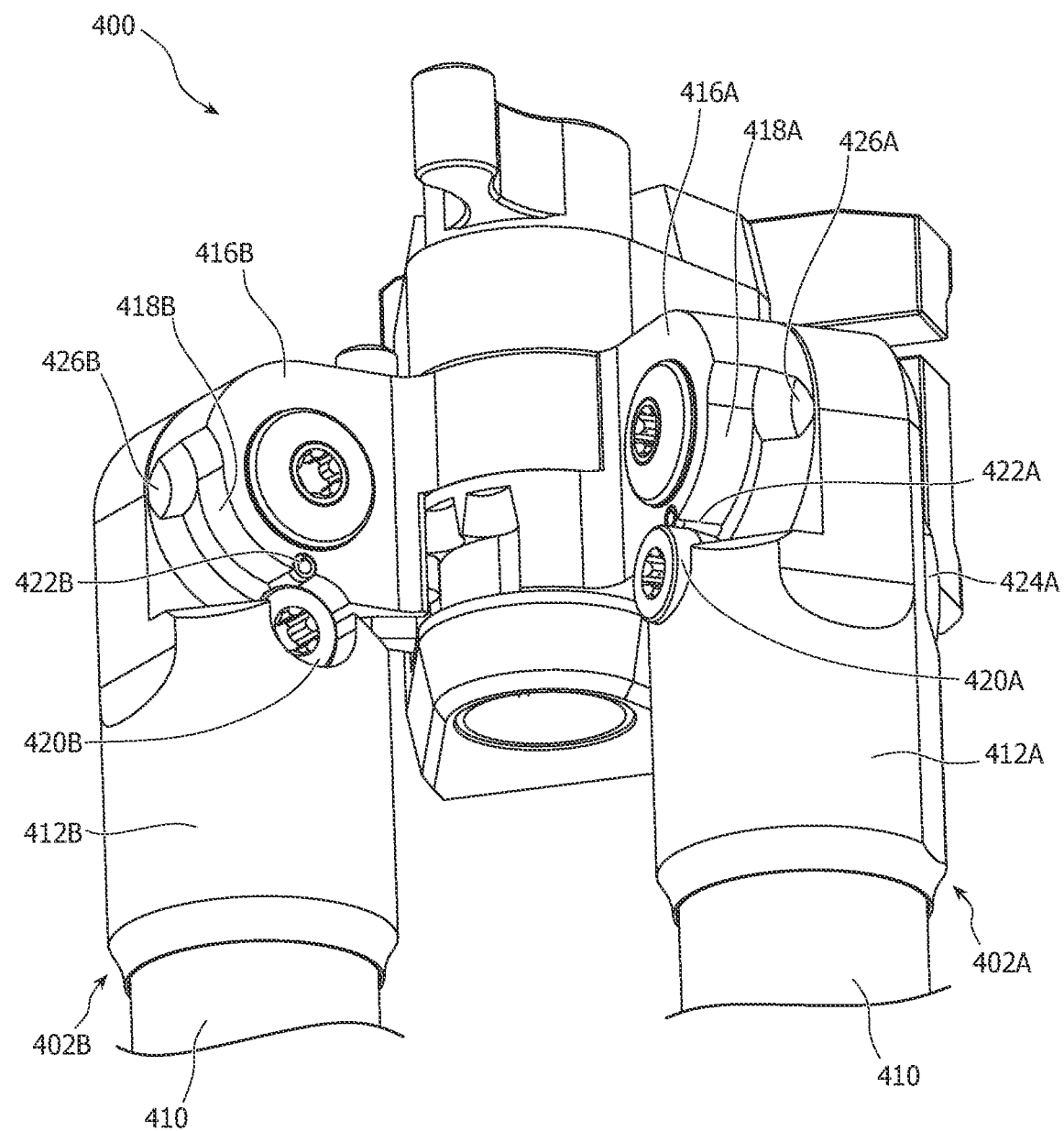
FIG. 4B is a detail view of the adjustable support apparatus shown in FIG. 4A in a first configuration.
Figure 4C:
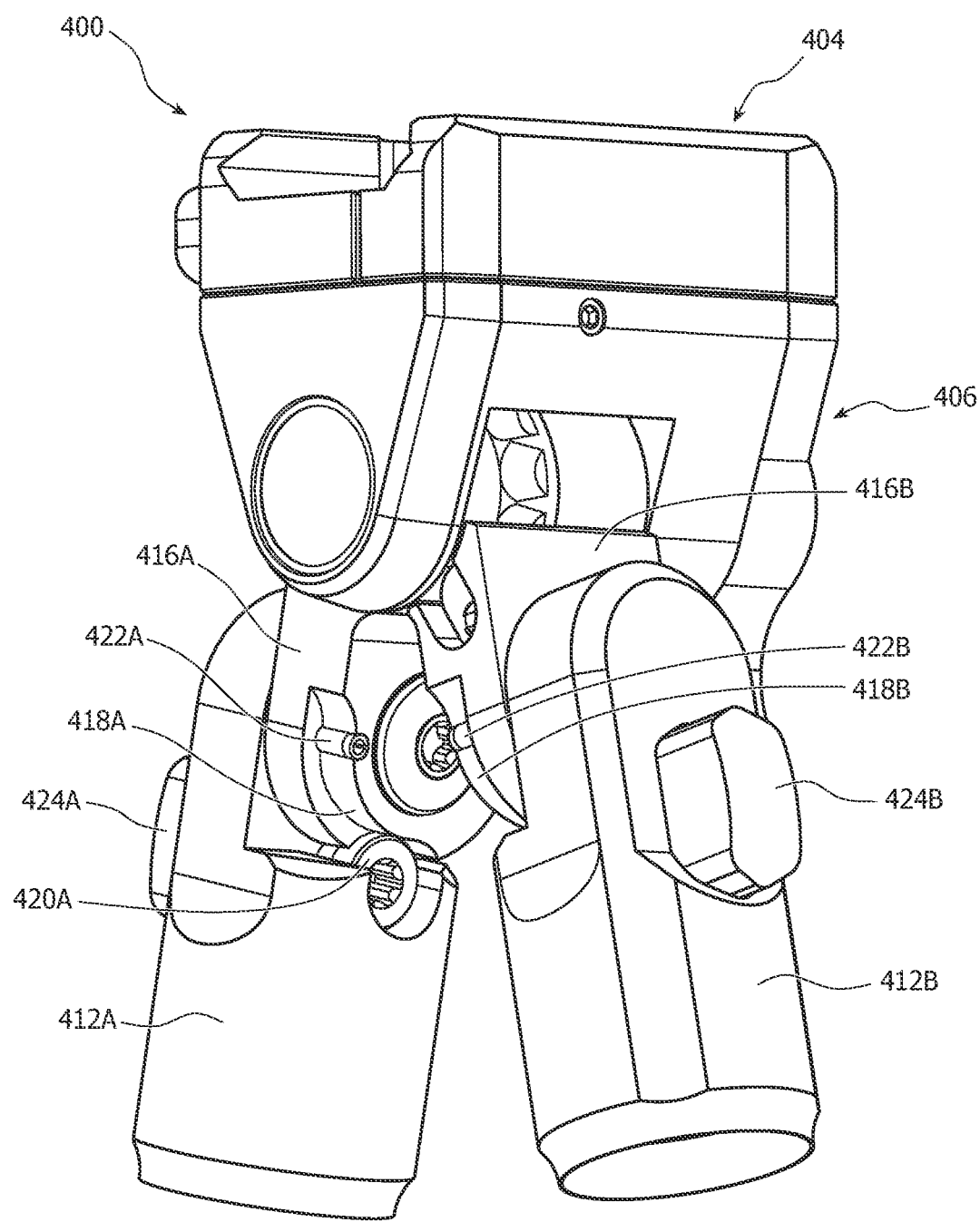
FIG. 4C is a detail view of the adjustable support apparatus shown in FIG. 4A in a second configuration.

FIGS. 4A and 4B show the adjustment mechanism 400 in a first configuration wherein the retaining mechanism 404 and the adjustment mechanism 406 are in a stowed position, as opposed to the upright configuration shown in FIGS. 1 and 4C. In the first configuration (i.e., the stowed position), the first and/or second support members 402A, 402B can be rotated relative to the retaining mechanism 404 and the adjustment mechanism 406. For example, one or more of the support members 402A, 402B can be rotated about respective axes defined by couplers 416A, 416B of the adjustment mechanism 406. Each of the couplers 416A, 416B can include a radial or curved surface 418A, 418B that accommodate radial travel or movement of respective interlocks 420A, 420B coupled to the respective mounting bracket 412A, 412B of each of the first and second support members 402A, 402B. A protrusion 422A can extend from the curved surface 418A at a location on the curved surface 418A that impedes or inhibits radial movement of the interlock 420A and thereby retains the support member 402A in the first configuration. Additionally, or alternatively, a protrusion 422B can extend from the curved surface 418B at a location on the curved surface 418B that impedes or inhibits radial movement of the interlock 420B and thereby retains the support member 402B in the first configuration.

In some examples, each of the interlocks 420A, 420B can be coupled to a respective actuator 424A, 424B by an elongate member (not shown) extending through the respective mounting brackets 412A, 412B. Pressing the actuator 424A can slide or translate the interlock 420A relative to the curved surface 418A of the coupler 416A and disengage or displace the interlock 420A from a recess 426A formed within the curved surface 418A. While displaced from the recess 426A, the first support member 402A can be rotated relative to the coupler 416A to transition between the first configuration (shown in FIG. 4C) and the second configuration (shown in FIGS. 4A and 4B). For example, the first support member 402A can be rotated relative to the coupler 416A such that the interlock 420A moves along the curved surface 418A and over the protrusion 422A. In some examples, a sufficient force is required to overcome resistance to rotation generated by the protrusion 422A, 422B. In other words, a threshold rotational force can be required to transition the apparatus 400 from the first configuration to the second configuration.

The interlock 420A can deform, flex, translate, move, or distort the protrusion 422A to move past the protrusion 422A. Alternatively, or additionally, the interlock 420A can deform, flex, translate, move, or distort while moving past the protrusion 422A. In some examples, the interlock 420A can move or translate away from the protrusion 422A while the interlock 420A is transitioned away from the recess 426A and past the protrusion 422A. While a correlation between the movement of the interlock 420A and the protrusion 422A are described above, the description is also applicable to movement of the interlock 420B and the protrusion 422B. While the protrusions 422A, 422B shown in FIGS. 4A-4C are illustrated as roll-pins disposed within a recess formed within each respective curved surface 418A, 418B, the protrusions 422A, 422B can be any component, device, fastener, or element capable of limiting or inhibiting radial movement of the respective interlocks 420A, 420B.

For example, the protrusions 422A, 422B can be a set screw, a magnet, a roll-pin, a spring, a protrusion integrally formed with the curved surface, another type of protrusion, or a combination thereof.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. An apparatus for supporting a device, comprising:
   a support member;
   a retaining mechanism coupled to the support member and configured to releasably couple to the device, the retaining mechanism comprising:
      a first bracket;
      a second bracket connected to the first bracket;
      a base rotatably and directly coupled to the first bracket, the base forming a channel;
      a detent releasably coupling the first bracket and the base to control rotation of the first bracket and the second bracket above the base relative to an axis of rotation intersecting the base; and
      an actuator configured to engage the detent;
   wherein rotation of the first and second brackets about the axis of rotation causes the second bracket to translate, relative to the first bracket, in a direction perpendicular to the axis of rotation and radially along the channel.

2. The apparatus of claim 1, wherein:
   the first bracket defines a first aperture;
   the base defines a second aperture; and
   the base is rotatably and directly coupled to the first bracket via a splined coupler extending at least partially through the first aperture and the second aperture.

3. An apparatus for supporting a device comprising:
   a support member;
   a retaining mechanism coupled to the support member and configured to releasably couple to the device, the retaining mechanism comprising:
      a first bracket;
      a second bracket; and
      a base coupled to the first bracket and configured to enable rotation of the first bracket and the second bracket relative to an axis of rotation intersecting the base, wherein:
      the second bracket is configured to translate in a direction perpendicular to the axis of rotation during rotation of the first and second brackets about the axis of rotation;
      the base forms a channel offset a distance from the axis of rotation; and
      a length of the channel correlates to a displacement of the second bracket relative to the base.

4. The apparatus of claim 3, wherein the distance between the axis of rotation and the channel varies along the length of the channel.

5. The apparatus of claim 3, wherein the base comprises a biasing member disposed within the channel, the biasing member extending substantially the length of the channel.

6. The apparatus of claim 1, wherein the second bracket is biased to translate away from the first bracket.

7. The apparatus of claim 1, wherein:
   the actuator is a button actuator;
   in a first state, the button actuator is disengaged from the detent so that the detent remains extended to prevent rotation of the first and second brackets about the axis of rotation; and
   in a second state, the button actuator is engaged with the detent to so that the detent is retracted to enable rotation of the first and second brackets about the axis of rotation.

8. The apparatus of claim 1, wherein the support member is a first support member and the apparatus further comprises a second support member coupled to the retaining mechanism.

9. The apparatus of claim 1, wherein the support member is telescopic.

10. The apparatus of claim 1, wherein:
    the first bracket defines a first slot; and
    the second bracket forms a second slot.

11. The apparatus of claim 1, wherein the retaining mechanism is configured to removably couple to a rifle, a camera, or binoculars.

12. An apparatus for supporting a device, comprising:
    a first support member;
    a second support member;
    an adjustment mechanism coupled to the first and second support members, the adjustment mechanism comprising:
       a first coupler affixed to the first support member;
       a second coupler affixed to the second support member, the second coupler having a plurality of recesses defined about at least a portion of a periphery of the second coupler;
       a central member having a cylinder affixed to the first coupler and the second coupler, the central member defining an axis of rotation, at least one of the first coupler and the second coupler being rotatable about the axis of rotation;
       a threaded cap disposed on a first end of the central member;
       a rotatable lever disposed on a second end of the central member opposite the first end, the rotatable lever having a handle portion extending perpendicularly away from both of the axis of rotation and a body of the rotatable lever, and the rotatable lever being rotatable about the axis of rotation to cause the threaded cap to translate relative to the rotatable lever to vary a compressive force between the first coupler and the second coupler in intimate contact,
       wherein the first coupler and the second coupler are separate and sequentially positioned along the central member between the rotatable lever and the threaded cap such that:
          the first coupler is positioned in intimate contact with the rotatable lever, the handle portion being offset from the first coupler and the axis of rotation; and
          the second coupler is positioned in intimate contact with the threaded cap;
       an interlock disposed between the first coupler and the second coupler, the interlock being translatable along an additional axis parallel to the axis of rotation; and
       an actuator coupled to the interlock via an elongate portion extending through the first coupler, the actuator being accessible to user depression through an exterior surface of the first coupler, wherein in response to the user depression of the actuator toward the interlock, the elongate portion is configured to displace the interlock along the additional axis from a first recess of the plurality of recesses to a second recess of the plurality of recesses, the first recess being radially offset relative to the second recess.

13. The apparatus of claim 12, wherein:
the first and second couplers define a first angle while the interlock is disposed in the first recess; and
the first and second couplers define a second angle while the interlock is disposed in the second recess.

14. The apparatus of claim 12, further comprising a spring biasing the interlock toward the plurality of recesses.

15. The apparatus of claim 12, wherein the actuator is a button actuator.

16. The apparatus of claim 12, wherein the additional axis is perpendicular to a longitudinal axis of the second coupler.

17. An apparatus for supporting a device, comprising:
a support member;
a mounting bracket coupled to the support member;
an adjustment mechanism comprising:
a coupler rotatably affixed to the mounting bracket and forming a curved surface; and
a protrusion disposed within a recess formed in the curved surface and extending radially outward from the curved surface; and
an interlock slideably coupled to the mounting bracket and positioned adjacent the curved surface, the interlock configured to radially contact the protrusion to impede rotation of the mounting bracket relative to the coupler.

18. The apparatus of claim 17, wherein the protrusion is configured to deform, flex, translate, move or distort in response to the interlock moving past the protrusion.

19. The apparatus of claim 17, wherein the interlock is configured to deform, flex, translate, move or distort in response to the interlock moving past the protrusion.

20. The apparatus of claim 17, wherein:
the protrusion imparts a rotational resistance to the interlock; and
a threshold rotational force applied via the interlock is configured to overcome the rotational resistance.

* * * * *